United States Patent [19]

Nesheiwat

[11] Patent Number: 5,053,487

[45] Date of Patent: Oct. 1, 1991

[54] METHOD TO RECOVER HIGH MOLECULAR WEIGHT POLY(ARYLENE SULFIDE) BY REPRECIPITATION

[75] Inventor: Afif M. Nesheiwat, Chatham, N.J.

[73] Assignee: Phillips Petroleum Company, Bartlesville, Okla.

[21] Appl. No.: 417,173

[22] Filed: Oct. 4, 1989

[51] Int. Cl.$^5$ .............................................. C08G 75/14
[52] U.S. Cl. ................................................... 528/388
[58] Field of Search ......................................... 528/388

[56] References Cited

U.S. PATENT DOCUMENTS

| | | | |
|---|---|---|---|
| 4,071,509 | 1/1978 | Edmonds, Jr. ........................ | 260/79 |
| 4,415,729 | 11/1983 | Scoggins et al. ..................... | 528/388 |
| 4,748,231 | 5/1988 | Nesheiwat .......................... | 528/486 |

FOREIGN PATENT DOCUMENTS

| | | |
|---|---|---|
| 166368 | 1/1986 | European Pat. Off. . |
| 60-235838 | 11/1985 | Japan . |

Primary Examiner—Harold D. Anderson
Assistant Examiner—T. Mosley
Attorney, Agent, or Firm—Beverly M. Dollar

[57] ABSTRACT

In one embodiment, the inventive process comprises: (a) preparing a first slurry comprising a first particulate PAS resin and a polar organic compound, (b) heating the first slurry to a temperature in the range of about 20° C. (68° F.) to about 40° C. (104° F.) below the liquid-to-solid phase transitional temperature of the first particulate resin, and (c) rapidly cooling the first slurry to below about 50° C. (122° F.) below the liquid-to-solid phase transitional temperature of the first particulate resin in the polar organic compound to form a second slurry, comprising the polar organic compound and a polymeric mixture comprising a novel particulate high molecular weight PAS resin and a minor amount of a particulate low molecular weight PAS resin.

In another embodiment, the inventive process comprises: (a) preparing a liquid mixture comprising a first particulate PAS resin and a polar organic compound, at a temperature above the solid-to-liquid phase transitional temperature of the first particulate resin, (b) slowly cooling the liquid mixture to between about 20° C. (68° F.) to about 40° C. (104° F.) below the liquid-to-solid phase transitional temperature of the first particulate PAS in the polar organic compound resin to form a first slurry comprising the polar organic compound and a second particulate PAS resin, and (c) rapidly cooling the first slurry to about 50° C. (122° F.) below the liquid-to-solid phase transitional temperature of the first particulate resin in the polar organic compound, thus forming a second slurry comprising the polar organic compound and a polymeric mixture comprising a third particulate high molecular weight resin, wherein third particulate resin, when recovered has a higher molecular weight than its respective first and second particulate resins, if recovered by conventional means.

11 Claims, No Drawings

METHOD TO RECOVER HIGH MOLECULAR WEIGHT POLY(ARYLENE SULFIDE) BY REPRECIPITATION

FIELD OF THE INVENTION

This invention relates to a process for the production of poly(arylene sulfide). In one aspect, this invention relates to a process of producing and recovering high molecular weight poly(arylene sulfide).

BACKGROUND OF THE INVENTION

In applications such as in the production of fibers and films from arylene sulfide polymers, moderately branched to linear poly(arylene sulfide) resins, henceforth PAS, are often preferred over branched types. Furthermore, it is desirable that these moderately branched to linear PAS resins have as high a molecular weight as possible in order to meet specialized product requirements.

While high molecular weight branched PAS resins can readily be produced by the addition of branching agents (e.g., trichlorobenzene) to the polymerization process, moderately branched to linear, high molecular weight PAS resins cannot be made by this method. Previous methods to produce high molecular weight PAS resins without the use of branching agents include air curing the polymer, extracting the low molecular weight fractions from the polymer, and using reaction modifying agents (e.g., alkali metal carboxylates) in the polymerization process. While these previous methods proved to be successful, there exist certain cost and/or physical limitations associated therewith which would not make them available to some who desire moderately branched to linear, higher molecular weight PAS resins. Therefore, it would be beneficial if an improved method of preparation could be devised which results in a moderately branched to linear, high molecular weight PAS.

Linear and non-linear PAS resins can be produced by various processes using polyhalo-substituted aromatic compounds (e.g., dihalobenzenes, trihalobenzenes, dihalobenzophenones and dihaloaromatic sulfones). After the PAS resin is polymerized, the particulate PAS resin must be recovered from the polymerization reaction mixture. There are several conventional means for recovering linear and non-linear PAS resins from a completed polymerization reaction mixture such as, for example, flashing the liquid reaction media or a recovery process referred to as a liquid quench process such as that described in U.S. Pat. No. 4,415,729.

In the liquid quench process, a waste product often referred to as "slime" is produced. This slime generally comprises low molecular weight PAS fines. While the liquid quench process does separate some of this slime material from the more useful, higher molecular weight polymeric material, this separation is not complete. If this slime material (i.e., low molecular weight PAS fines) is not separated from the more useful, higher molecular weight polymeric material, this will result in lowering the molecular weight of the final recovered polymeric product. Therefore, one object of this invention is to provide a process for effectively separating the lower molecular weight polymeric material. This inventive separation process results in substantially increasing the molecular weight of the final recovered polymeric product.

Other aspects, concepts, and objects of this invention will become apparent from the following Detailed Description when considered with the appended claims.

SUMMARY OF THE INVENTION

This invention provides a process for producing and recovering improved high molecular weight PAS resins.

In accordance with one embodiment, the inventive process comprises: (a) preparing a first slurry, wherein the solid component thereof comprises a first particulate PAS resin, and wherein the liquid component thereof comprises a polar organic compound, (b) heating the first slurry to a temperature in the range of about 20° C. (68° F.) to about 40° C. (104° F.) below the liquid-to-solid phase transitional temperature of the first particulate PAS resin in the polar organic compound, and (c) rapidly cooling the heated first slurry to a temperature below about 50° C. (122° F.) below the liquid-to-solid phase transitional temperature of the first particulate PAS resin in the polar organic compound to form a second slurry, wherein the liquid component thereof comprises the polar organic compound and wherein the solid component thereof comprises a particulate polymeric mixture comprising a novel particulate high molecular weight PAS resin and a minor amount of particulate low molecular weight PAS resin, such that the final recovered PAS resin has a higher molecular weight than its respective first particulate resin would if recovered by conventional means.

In accordance with another embodiment, the inventive process comprises: (a) preparing a heated liquid mixture comprising a first particulate PAS resin in a liquid phase and a polar organic compound, wherein the temperature of the liquid mixture is above the solid-to-liquid phase transitional temperature of the first particulate PAS resin in the polar organic compound, (b) slowly cooling the liquid mixture to a temperature about 20° C. (68° F.) to about 40° C. (72° F.) below the liquid-to-solid phase transitional temperature of the first particulate PAS resin in the polar organic compound, to form a first slurry, wherein the liquid component thereof comprises the polar organic compound, and wherein the solid component thereof comprises a second particulate high molecular weight PAS resin, and (c) rapidly cooling the first slurry to a temperature of about 50° C. (122° F.) below the liquid-to-solid phase transitional temperature of the first particulate PAS resin in the polar organic compound to form a second slurry, wherein the liquid component thereof comprises the polar organic compound, and wherein the solid component thereof comprises a third particulate polymeric mixture comprising the novel particulate high molecular weight PAS resin and a minor amount of particulate low molecular weight PAS resin, such that the final recovered PAS resin has a higher molecular weight than its respective first and second particulate resins would if recovered by conventional means.

The novel particulate high molecular weight PAS resin prepared in accordance with this invention has a higher molecular weight than its respective first particulate PAS resin would, if recovered by conventional means. The low molecular weight PAS resin resulting from this inventive process has a lower molecular weight than the first particulate PAS resin would, if recovered by conventional means. Thus, the high molecular weight PAS resin component can readily be separated from the low molecular weight PAS resin component in order to obtain the final product exhibiting the higher molecular weight.

DETAILED DESCRIPTION OF THE INVENTION

This invention is useful with particulate PAS resins regardless of their method of preparation. Generally, the PAS resins treated in accordance with this invention are phenylene sulfide polymers. Specifically, this invention can be employed to increase the molecular weight of a PAS resin by separating out the lower molecular weight resin constituent therefrom.

In general, the PAS resins treated by this invention can be produced by contacting a polyhaloaromatic compound with a sulfur source and a polar organic compound under polymerization conditions. Optionally, components such as polyhaloaromatic compounds having more than two halogen substituents per molecule, and/or polymerization modifying compounds (e.g., alkali metal carboxylates and/or lithium halides) can also be added to the polymerization process.

Examples of PAS resins which can be treated in accordance with this invention include, but are not limited to, poly(arylene sulfides), poly(arylene sulfide ketones), poly(arylene sulfide diketones), poly(biarylene sulfides) and poly(arylene sulfide sulfones). The "arylene" group of the above PAS resin examples is preferably a phenylene group.

Although other polymeric resins are not excluded, in general, the PAS resins most apt to be treated in accordance with this invention can be represented by having as the repeating unit:

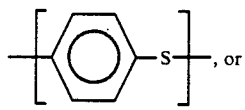

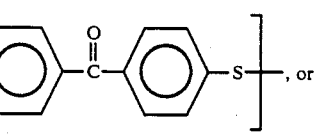

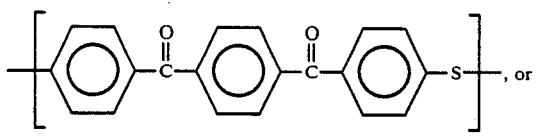

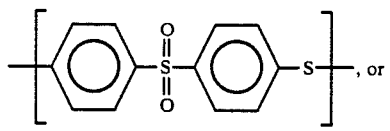

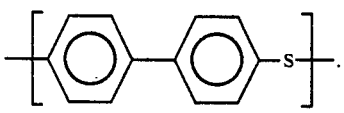

According to the present invention, the molecular weight of a PAS resin is determined by measuring the resin's melt flow rate. A high melt flow rate is indicative of a lower molecular weight PAS resin and vice versa.

As used herein, the terms "melt flow" and/or "flow rate" are used interchangeably and refer to the rate at which a melted PAS resin flows through an orifice, having a specific diameter and length, when subjected to a specific downward pressure. Melt flow values are recorded in units of grams of extrudate which have flowed through the orifice over a ten minute interval (g/10 min) and are determined by a modified version of ASTM D1238, Procedure B, Condition X/5.0, where X is a specific temperature which depends on the particular PAS resin being tested. For example, for polyphenylene sulfide resin, X is 315° C. The modification employed herein is that the initial preheating time is 5 minutes, as opposed to the minimum 6 minute period specified by ASTM D1238, Procedure B.

The invention provides a process for producing and recovering improved high molecular weight PAS resins. Since the embodiments of this invention can be practiced at any time after a PAS resin is polymerized, it can be viewed as either (1) an effective means for providing a PAS resin having associated therewith increased molecular weight, or (2) a means for isolating an increased molecular weight fraction of a previously prepared PAS resin.

When practicing the first embodiment of this invention, a first slurry is prepared wherein the solid component thereof comprises a first particulate PAS resin, and wherein the liquid component thereof comprises a polar organic compound. Any suitable method can be employed to prepare this first slurry. An example of suitable method which will produce such a first slurry is one wherein a polyhalo-substituted aromatic compound is contacted under suitable polymerization conditions with reactants comprising a sulfur source, a polar organic compound and water, to produce a polymer containing polymerization reaction mixture. Depending upon the type of polymer prepared, this reaction mixture can be either (a) a liquid mixture, comprising a particulate PAS resin in a liquid phase, a polar organic compound, water, unreacted monomer and various liquid by-product materials or (b) a slurry, wherein the solid component thereof comprises a particulate PAS resin, and wherein the liquid component thereof comprises a polar organic compound, water, unreacted monomer and various liquid by-product materials.

When practicing the first embodiment of this invention, if the first slurry is prepared from a completed PAS polymerization process, and further if the reaction mixture of this completed polymerization process is a liquid mixture wherein the particulate PAS resin is in a liquid phase, the temperature of this liquid mixture must be lowered to below the liquid-to-solid phase transitional temperature of the liquid-phase PAS resin contained therein. Under these conditions, a first slurry results, wherein the solid component thereof comprises a first particulate PAS resin, and wherein the liquid component thereof comprises a polar organic compound, water, unreacted monomer and various liquid by-product materials.

The phase "liquid-to-solid phase transitional temperature," as used herein, refers to the temperature at which a liquid mixture comprising a liquid-phase PAS resin must be lowered in order to solidify the liquid-phase PAS resin.

While the liquid-to-solid phase transitional temperature differs with the type of PAS resin produced and with the concentration and nature of the remaining liquid constituents in contact therewith, it can readily determined by one of ordinary skill in the art. For example, by using a high pressure, flat glass gage that can be heated, such as that available from the Jerguson Gage & Valve Co., it can be seen that poly(phenylene sulfide), when in the presence of the polar organic compound NMP, has a liquid-to-solid phase transitional temperature of about 230° C. (446° F.). Therefore, in order to solidify a liquid-phase poly(phenylene sulfide) present in a liquid mixture also comprising NMP, the temperature of a liquid mixture must be lowered to below about 230° C. (446° F.).

Poly(phenylene sulfide ketone) has a liquid-to-solid phase transitional temperature of about 245° C. (473° F.) when in the presence of the polar organic compound NMP. Therefore, in order to solidify a liquid-phase poly(phenylene sulfide ketone) present in a liquid mixture also comprising NMP, the temperature of a liquid mixture must be lowered to below about 245° C. (473° F.).

Poly(phenylene sulfide diketone) has a liquid-to-solid phase transitional temperature of about 302° C. (576° F.), when in the presence of the polar organic compound NMP. Therefore, in order to solidify a liquid-phase poly(phenylene sulfide diketone) present in a liquid mixture also comprising NMP, the temperature of a liquid mixture must be lowered to below about 302° C. (576° F.).

Another example of a suitable method which results in such a first slurry comprises taking a particulate PAS resin which has already been prepared, recovered, and optionally dried, and adding this particulate resin to a liquid mixture comprising a polar organic compound.

In the first slurry employed in the first embodiment of this invention, the molar ratio of the moles of solvent per moles of divalent sulfur present in the first particulate PAS resin is generally determined by mechanical and/or economic limitations. Preferably, in the first slurry, the molar ratio of the moles of polar organic compound to the moles of divalent sulfur present in the first particulate resin ranges from about 3:1 to about 25:1; more preferably, from about 6:1 to about 20:1; and even more preferably, from about 8:1 to about 16:1.

The moles of divalent sulfur present in the first particulate PAS resin can be readily determined by one of ordinary skill in the art. For example, if the heated first slurry which contains the first particulate PAS resin is the slurry which results at the termination of a typical polymerization reaction, the moles of divalent sulfur present in the PAS resin are approximately equal to the moles of sulfur charged to the polymerization vessel.

The polar organic compounds useful when practicing this invention are polar organic compounds which those of ordinary skill in the art employ in the polymerization processes of PAS resins. Examples of such polar organic compounds include, but are not limited to, hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, low molecular weight polyamides, and mixtures thereof. The presently preferred polar organic compound for practicing this invention is NMP.

If treating the PAS resin in accordance with the first embodiment of this invention, after the first slurry is prepared, the slurry is heated to a temperature in the range of about 20° C. (68° F.) to about 40° C. (104° F.) below the liquid-to-solid phase transitional temperature of the first particulate PAS resin contained therein. The time for which the first slurry should be held within this temperature range depends in part on the treating temperature employed, the concentration of the lower molecular weight PAS resin in the first particulate PAS resin, and the desired concentration of lower molecular weight PAS resin in the novel particulate high molecular weight PAS resin. The hold period of the first slurry in the appropriate temperature range generally ranges from about 5 seconds to about 8 hours, preferably from about 10 seconds to about 4 hours.

After the first slurry is heated to the appropriate elevated temperature and held at that temperature for the appropriate period of time, the temperature of this first slurry is rapidly lowered to a temperature of about 50° C. (122° F.) below the liquid-to-solid phase transitional temperature of the first particulate resin in the polar organic compound. Preferably, the temperature of this first slurry is rapidly lowered to a temperature of about 75° C. (167° F.) below the liquid-to-solid phase transitional temperature of the first particulate resin.

The term "rapid lowering of the temperature" is meant to describe a reduction in temperature that is achieved by applying a cooling means to the contents of the reactor, as opposed to allowing the reactor contents to cool undisturbed. One of ordinary skill in the art may choose any convenient means to achieve such cooling, such as, for example, applying cooling water to the reactor. Generally, this cooling of the heated first slurry will occur at a rate greater than about 1° C. (1.8° F.)/minute.

The rapid cooling of the heated first slurry to a temperature of about 50° C. (122° F.) below the liquid-to-solid phase transitional temperature of the first particulate resin contained therein results in the formation of a second slurry, wherein the liquid component thereof comprises a polar organic compound and wherein the solid component thereof comprises a particulate polymeric mixture comprising a novel particulate high molecular weight PAS resin and a minor amount of particulate low molecular weight PAS resin.

Because of the difference in particle size of the low molecular weight and high molecular weight PAS resins present in the particulate polymeric mixture produced, the high molecular weight resin can be separated from the low molecular weight resin by, for example, filtration through an appropriately chosen filtration means.

When practicing the second embodiment of this invention, a heated liquid mixture comprising a first particulate PAS resin in a liquid-phase and a polar organic compound is prepared. This liquid mixture is at an elevated temperature which is sufficient to maintain the PAS resin contained therein in a liquid-phase.

Any suitable method can be employed to prepare this heated liquid mixture. An example of suitable method which will produce such a heated liquid mixture is one wherein a polyhalo-substituted aromatic compound is contacted under suitable polymerization conditions with reactants comprising a sulfur source, a polar organic compound and water, to produce a polymerization reaction mixture. Depending upon the type of polymer prepared, this reaction mixture can be either (a) a liquid mixture, comprising a particulate PAS resin in a liquid phase, a polar organic compound, water, unreacted monomer and various liquid by-product materials; or (b) a slurry, wherein the solid component thereof comprises a particulate PAS resin, and wherein the liquid component thereof comprises a polar organic compound, water, unreacted monomer and various liquid by-product materials.

When practicing the second embodiment of this invention, if the heated liquid mixture is prepared from a completed PAS polymerization process, and further if the reaction mixture of this completed polymerization process is a slurry wherein the solid component thereof comprises a particulate PAS resin, the temperature of this slurry must be elevated to a point above the solid-to-liquid phase transitional temperature of the particulate PAS resin contained therein. Under these conditions, a liquid mixture results. This liquid mixture comprises the first particulate PAS resin in a liquid phase, a polar organic compound, unreacted monomer and various liquid by-product materials.

Another example of a suitable method which results in such a heated liquid mixture comprises taking a particulate PAS resin which has already been prepared, recovered, and optionally dried, and adding this particulate resin to a liquid mixture comprising a polar organic compound to form a slurry. This slurry is then heated to a temperature which is at or above the solid-to-liquid phase transitional temperature of the first particulate resin contained therein.

The time for which the heated liquid mixture should be held above this solid-to-liquid phase transitional temperature depends, in part, on the temperature employed, and the concentration of the higher molecular weight PAS resin in the first particulate PAS resin. The hold period of the liquid mixture at or above the solid-to-liquid phase transitional temperature generally ranges from about 5 seconds to about 8 hours, preferably from about 10 seconds to about 4 hours.

In the heated liquid mixture employed in the second embodiment of this invention, the molar ratio of the moles of polar organic compound per moles of first particulate PAS resin is generally determined by mechanical and/or economic limitations and can readily be determined by one of ordinary skill in the art without undue experimentation.

The polar organic compounds useful when practicing the second embodiment of this invention are the same as those useful when practicing the first embodiment of this invention. The presently preferred polar organic compound for practicing the second embodiment of this invention is NMP.

If treating the PAS resin in accordance with the second embodiment of this invention, after the heated liquid mixture is prepared, the heated liquid mixture is slowly cooled to a temperature in the range of about 20° C. (68° F.) to about 40° C. (104° F.) below the liquid-to-solid phase transitional temperature of the liquid-phase, first particulate PAS resin contained therein, to form a first slurry wherein the solid component thereof comprises a second particulate PAS resin, and wherein the liquid component thereof comprises the polar organic compound.

The term "slow cooling" is meant to imply that no external means are applied to reduce the temperature of the reactor contents. The contents are allowed to cool by removing all heating means from the reactor. Generally, this slow cooling of the heated liquid mixture occurs at a rate less than about 1° C. (1.8° F.)/minute.

The time for which the first slurry should be held within the temperature range set out above depends in part on the treating temperature employed, the concentration of the lower molecular weight PAS resin in the first particulate PAS resin, and the desired concentration of lower molecular weight PAS resin in the novel particulate high molecular weight PAS resin. The hold period of the first slurry at the appropriate temperature range generally ranges from about 5 seconds to about 8 hours, preferably, from about 10 seconds to about 4 hours.

After the heated liquid mixture has been cooled to the appropriate temperature to form the first slurry and held at that temperature for an appropriate period of time, the temperature of the first slurry is rapidly lowered to a temperature of about 50° C. (122° F.) below the liquid-to-solid phase transitional temperature of the first particulate resin. Preferably, the temperature of this first slurry is rapidly lowered to a temperature of about 75° C. (167° F.) below the liquid-to-solid phase transitional temperature of the first particulate resin.

The rapid lowering of temperature is achieved as previously described for the first embodiment. The rate at which the temperature of the first slurry is reduced during the rapid lowering is generally greater than about 1° C. (1.8° F.)/minute.

The rapid cooling of the heated first slurry to a temperature of about 50° C. (122° F.) below the liquid-to-solid phase transitional temperature of the first particulate resin contained therein results in the formation of a second slurry, wherein the liquid component thereof comprises a polar organic compound and wherein the solid component thereof comprises a third particulate polymeric mixture comprising a novel particulate high molecular weight PAS resin and a minor amount of particulate low molecular weight PAS resin.

Because of the difference in particle size of the low molecular weight and high molecular weight PAS resins present in the particulate polymeric mixture produced, the high molecular weight resin can be separated from the low molecular weight resin by, for example, filtration through an appropriately chosen filtration means.

The novel particulate high molecular weight PAS resin prepared in accordance with the second embodiment of the invention has a higher molecular weight than its respective first particulate PAS resin would if recovered by conventional means. The low molecular weight PAS resin resulting from this second embodiment of the invention has a lower molecular weight than the first particulate PAS resin would if recovered by conventional means.

EXAMPLES

The following are examples illustrating the process of the present invention. Particular materials employed, species, and conditions are intended to be further illustrative of this invention and are not meant to limit the reasonable scope thereof.

EXAMPLE I

This example illustrates the operation of the first embodiment of this invention in which the first slurry is heated to a temperature in the range of about 20° C. to about 40° C. below the liquid-to-solid phase transitional temperature of the first particulate PAS resin in the polar organic compound.

To a one gallon stirred reactor was charged 1000 cc of N-methyl-2pyrrolidone (NMP) and 100 grams of a PPS polymer prepared using techniques disclosed in U.S. Pat. No. 3,919,177 and exhibiting a flow rate with smoking, of 18 g./10 min. (determined as indicated in Table I). The reactor was purged with nitrogen and sealed at atmospheric pressure. The reactor was heated to 200° C. and held there for one hour. Heating was then terminated, 500 cc of NMP at room temperature was rapidly added and the reactor was rapidly cooled to about room temperature by passing cold water through the cooling coils of the reactor. Opening the reactor revealed uniform granular particles which were recovered on a 100 mesh screen. The recovered and dried particles had a total mass of 91.5 grams, representing 91.5 weight percent of the polymer originally charged. The recovered polymer exhibited a flow rate of 6 g./10 min., with no smoking. The recovered polymer is hereinafter referred to as Resin 1.

To further illustrate the operation of the first embodiment of this invention, six additional resins were prepared using essentially the same technique as described for Resin 1 above. The results of these preparations as well as notations of variations from the procedure used for Resin 1 are contained in Table I, with the resins designated as Resins 2-7.

TABLE I

| Resin | Original Flow Rate[a] | Flow Rate After Treatment | Granular Yield, wt. % | Liquid Added | Treatment Temperature, °C. |
|---|---|---|---|---|---|
| 1 | 18 | 6 | 91.5 | NMP | 200 |
| 2 | 18 | 3.5 | 71.5 | NMP | 210 |
| 3 | 18 | 6.8 | 93.8 | NMP | 190 |
| 4 | 18 | 3.6 | 91.4 | Water | 200 |
| 5 | 75 | 56 | 93.2 | Water | 200 |
| 6 | 75 | 52 | 84.9 | Water | 210 |
| 7 | 138 | 78 | 94.4 | NMP | 200 |

[a]Flow rate, in g/10 min., of starting polymer, before treatment, as determined by ASTM D1238, Procedure B, condition 315/5.0, modified in that the initial preheat time used was five minutes rather than the six minute minimum specified by the test method.

In all cases of Example I, the product polymer had a lower flow rate than that of the starting polymer, demonstrating that the inventive process produced a polymer of higher molecular weight that that of the starting polymer.

EXAMPLE II

This example illustrates the operation of the second embodiment of this invention in which the first slurry is heated to a temperature above the liquid to solid phase transitional temperature of the first particulate PAS resin in the polar organic compound.

To a one gallon stirred reactor was charged 2000 grams of a PPS polymer slurry prepared using techniques described in U.S. Pat. No. 3,919,177 and exhibiting a flow rate of 75 g./10 min. (determined as indicated in Table II), 20 cc of water and 300 cc of N-methyl-2-pyrrolidone (NMP). The reactor was purged with nitrogen and sealed at atmospheric pressure. The reactor was heated to 260° C. and held there for ten minutes. Heating was then terminated and the reactor was cooled slowly to 200° C. Upon reaching this temperature, 500 cc of NMP at room temperature was rapidly added to the reactor and the reactor was rapidly cooled to about room temperature by passing cold water through the cooling coils of the reactor. Opening the reactor revealed uniform granular particles which were recovered on a 100 mesh screen. The recovered and dried particles had a mass of 322.8 grams, representing 16.1 weight percent of the polymer originally charged. The recovered polymer exhibited a flow rate of 60.5 g./10 min. The recovered polymer is hereinafter referred to as Resin 8.

To further illustrate the operation of the second embodiment of this invention, two additional resins were prepared using essentially the same technique as described for Resin 8 above. The results of these preparations, as well as notations of variations from the procedure used for Resin 8, are contained in Table II, with the resins designated as Resins 9 and 10.

TABLE II

| Resin | Original Flow Rate[a] | Flow Rate After Treatment | Granular Yield, wt % | Quench Liquid | Treatment Temperature, °C. |
|---|---|---|---|---|---|
| 8 | 75 | 60.5 | 16.1 | NMP | 260 |
| 9 | 75 | 54.3 | 16.1 | water | 260 |
| 10 | 75 | 57.4 | 15.8 | water | 260 |

[a]Flow rate, in g/10 min., of starting polymer, before treatment, as determined by ASTM D1238, Procedure B, condition 315/5.0, modified in that the initial preheat time used was five minutes rather than the six minute minimum specified by the test method.

In all cases of Example 2, the product polymer has a lower flow rate than that of the starting polymer, demonstrating that the inventive process produces a polymer of higher molecular weight that that of the starting polymer.

Although, this invention has been described in detail for purposes of illustration, it is not to construed as limited thereby, but is intended to cover all changes and modification within the spirit and scope thereof.

What is claimed is:

1. A process for preparing a particulate high molecular weight poly(arylene sulfide) resin comprising the steps of:
   (a) preparing a heated liquid mixture comprising a first particulate poly(arylene sulfide) resin in a liquid phase and a polar organic compound wherein the temperature of said liquid mixture is above the solid-to-liquid phase transitional temperature of said first particulate poly(arylene sulfide) resin,
   (b) slowly cooling said heated liquid mixture to a temperature of about 20° C. to about 40° C. below the liquid-to-solid phase transitional temperature of said first particulate poly(arylene sulfide) resin in said polar organic compound to form a first slurry comprising a liquid component and a solid component, wherein the liquid component of said first slurry comprises said polar organic compound and wherein the solid component of said first slurry comprises a second particulate high molecular weight poly(arylene sulfide) resin, and
   (c) rapidly cooling said first slurry to a temperature of about 50° C. below said liquid-to-solid phase transitional temperature of said first particulate poly(arylene sulfide) resin, to form a second slurry comprising a liquid component and a solid component, wherein the liquid component of said second slurry comprises said polar organic compound, and wherein the solid component of said second slurry comprises a particulate polymeric mixture comprising a third particulate high molecular weight poly(arylene sulfide) resin having a higher molecular weight than its respective first and second particulate resins would when recovered by conventional means.

2. A process according to claim 1 wherein said rapid cooling is at a rate greater than about 1° C./minute.

3. A process according to claim 1 wherein said slow cooling takes place at a rate of less than 1° C./minute.

4. A process according to claim 1 wherein said poly(arylene sulfide) resin is selected from the group consisting of poly(arylene sulfide)s, poly(arylene sulfide sulfone)s, poly(arylene sulfide ketone)s, poly(arylene sulfide diketone)s and poly(biarylene sulfide)s.

5. A process according to claim 1 wherein said poly(arylene sulfide) resin is poly(phenylene sulfide).

6. A process according to claim 4 wherein said poly(arylene sulfide) resin is a poly(arylene sulfide sulfone).

7. A process according to claim 4 wherein said poly(arylene sulfide) resin is a poly(arylene sulfide ketone).

8. A process according to claim 4 wherein said first slurry is prepared by contacting a polyhaloaromatic compound with a sulfur source and a polar organic compound under polymerization conditions.

9. A process according to claim 1 wherein said liquid component of said first slurry further comprises water.

10. A process according to claim 8 wherein said first slurry is prepared by adding an already recovered poly(arylene sulfide) resin to a liquid mixture comprising a polar organic compound.

11. A process according to claim 1 wherein said polar organic compound is N-methyl-2-pyrrolidone.

* * * * *